(12) United States Patent
Gudipati et al.

(10) Patent No.: US 11,818,012 B2
(45) Date of Patent: Nov. 14, 2023

(54) ONLINE RESTORE TO DIFFERENT TOPOLOGIES WITH CUSTOM DATA DISTRIBUTION

(71) Applicant: Amazon Technologies, Inc., Seattle, WA (US)

(72) Inventors: Krishna Chaitanya Gudipati, Fremont, CA (US); Sanjay Wangoo, San Ramon, CA (US); Fabian Oliver Nagel, Mountain View, CA (US); Ippokratis Pandis, Menlo Park, CA (US); Gokul Soundararajan, San Jose, CA (US); Aditya Subrahmanyan, Sunnyvale, CA (US); Induja Sreekanthan, Mountain View, CA (US); Yao Xiao, Sunnyvale, CA (US); Ankil Shah, Sunnyvale, CA (US); Yehan Zhang, Sunnyvale, CA (US); Siyi Zhang, Mountain View, CA (US); Vaishali Ravindra Narkhede, Sunnyvale, CA (US); Naresh Chainani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,195

(22) Filed: Jun. 30, 2022

(65) Prior Publication Data
US 2023/0171163 A1 Jun. 1, 2023

Related U.S. Application Data

(60) Provisional application No. 63/283,410, filed on Nov. 26, 2021.

(51) Int. Cl.
*H04L 41/12* (2022.01)
*G06F 11/14* (2006.01)

(52) U.S. Cl.
CPC .......... *H04L 41/12* (2013.01); *G06F 11/1464* (2013.01); *G06F 11/1469* (2013.01); *G06F 2201/80* (2013.01)

(58) Field of Classification Search
CPC ..... H04L 41/122; H04L 41/34; H04L 41/342; H04L 41/344; H04L 41/40; G06F 11/1464; G06F 11/1469; G06F 2201/80
See application file for complete search history.

(56) References Cited

U.S. PATENT DOCUMENTS

| 7,650,356 B2 | 1/2010 | Raheem |
| 8,626,717 B2 | 1/2014 | Bendakovsky et al. |

(Continued)

OTHER PUBLICATIONS

International Search Report and Written Opinion dated Mar. 20, 2023 in International Application No. PCT/JS2022/080421, Amazon Technologies, Inc, pp. 1-12.

(Continued)

*Primary Examiner* — Wing F Chan
*Assistant Examiner* — Billy H Ng
(74) *Attorney, Agent, or Firm* — S. Scott Foster; Kowert, Hood, Munyon, Rankin & Goetzel, P.C.

(57) ABSTRACT

Online restore may be performed between databases with different topologies while applying a custom data distribution. A request to restore a database into a different topology of nodes may be received. A plan to move different portions of the database from a current topology to the new topology made using a general distribution scheme. The plan may be performed to move the different portions of the database into the new topology and the database made available for access using the new topology. A background process may be applied to modify the distribution of the database at the new topology to match a custom distribution scheme that was implemented at the current topology.

20 Claims, 11 Drawing Sheets

(56) References Cited

U.S. PATENT DOCUMENTS

| | | | |
|---|---|---|---|
| 8,898,115 B1 | 11/2014 | Gunda et al. | |
| 10,268,710 B2 | 4/2019 | Hu et al. | |
| 10,740,353 B2 | 8/2020 | Horowitz et al. | |
| 10,846,305 B2 | 11/2020 | Merriman et al. | |
| 10,896,097 B1* | 1/2021 | Purcell | G06F 11/1451 |
| 10,977,277 B2 | 4/2021 | Merriman et al. | |
| 11,210,184 B1 | 12/2021 | Gupta et al. | |
| 2020/0019474 A1* | 1/2020 | Yoon | G06F 11/2094 |
| 2020/0050694 A1 | 2/2020 | Avalani | |
| 2022/0121667 A1* | 4/2022 | Wong | G06F 16/24554 |

OTHER PUBLICATIONS

Gupta Anurag, et al, "Amazon Redshift and the Case for Simpler Data Warehouses", Proceedings of the 2015 ACM SIGMOD international conference on management of data (SIGMOD '15), pp. 1917-1923, May 27, 2015, ACM Press, New York, New York, USA.

Le Pape,Cecile, et al: "Replica Refresh Strategies in a Database Cluster", High Performance Computing for Computational Science—VECPAR 2006: 7th International Conference, Rio de Janeiro, Brazil, Jun. 10-13, 2006, pp. 379-691, Revised Selected and Invited Papers 7, Springer Berlin Heidelberg, 2007.

U.S. Appl. No. 17/810,293, filed Jun. 30, 2022, Fabian Oliver Nagel.

* cited by examiner

ONLINE RESTORE TO DIFFERENT TOPOLOGIES WITH CUSTOM DATA DISTRIBUTION

RELATED APPLICATIONS

This application claims benefit of priority to U.S. Provisional Application Ser. No. 63/283,410, entitled "ONLINE RESTORE TO DIFFERENT TOPOLOGIES WITH CUSTOM DATA DISTRIBUTION," filed Nov. 26, 2021, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
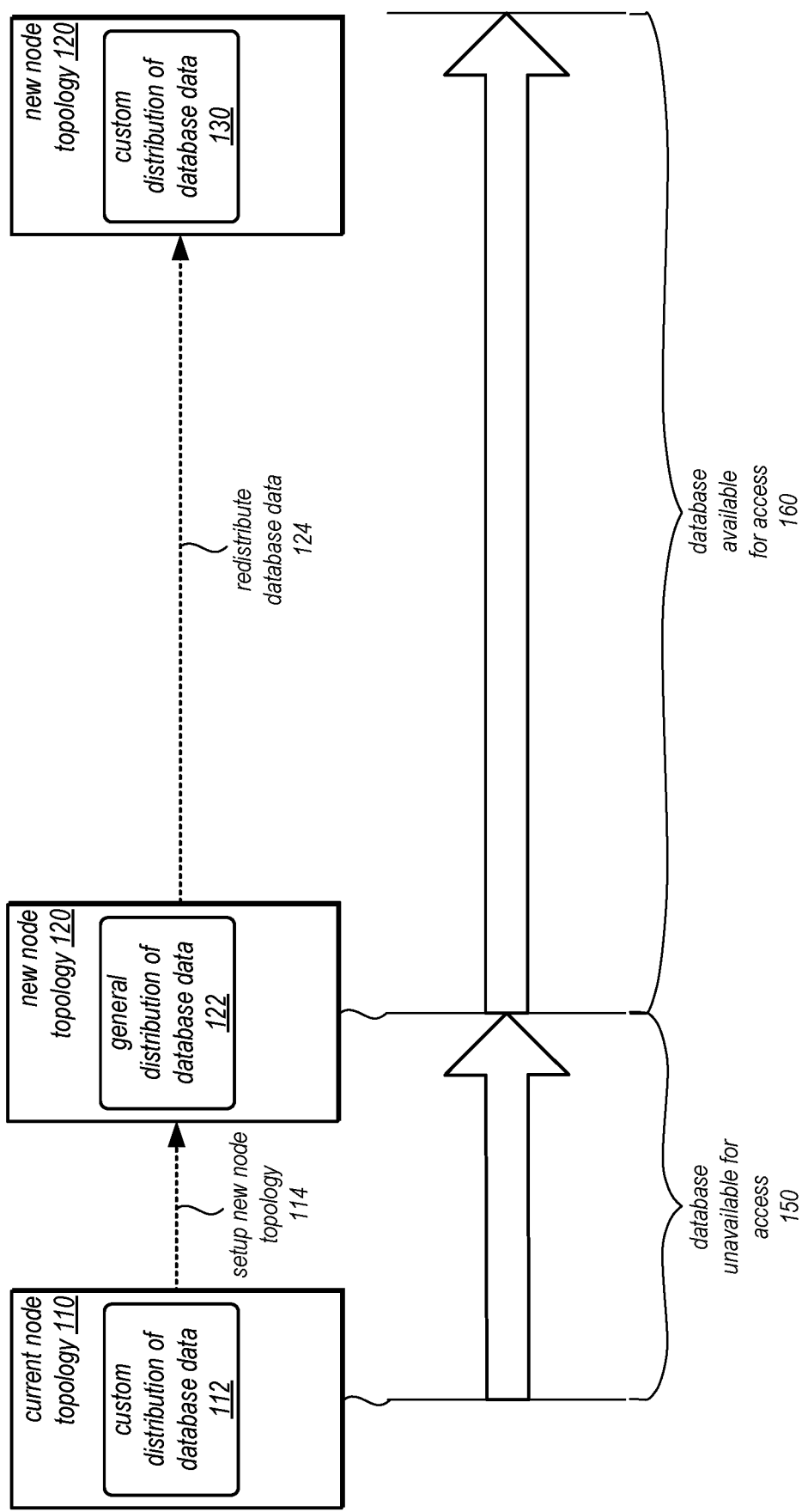
FIG. 1 illustrates a logical block diagram of online restore to different topologies with custom data distribution, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various methods and techniques of online restore to different topologies with custom data distribution are described herein. Database workloads vary over time. One configuration of resources may initially be right-sized to achieve a desired performance for accessing database and then due to a change in workload no longer be sized correctly, providing inefficient performance or inefficient use of resources.

Restore techniques may be performed in order to move a database from one group of resources (e.g., processing cluster or other grouping of compute nodes that store or provide access to a database) to another group of processing nodes. However, a different group of resources may have a different topology (e.g., a different physical layout, such as a different number of node slices across a cluster of nodes, where a node slice is a portion of node resources, such as memory, disk space, and a processor core of a multi-core processor). While some restore techniques can move a database between groups of resources, the downtime when the database is unavailable for access can be a deterrent to moving to a more efficient or more performant group of resources. Therefore, techniques that perform an online restore (e.g., where a database is available for a large majority of the time when moving), may be highly desirable.

For instance, some database services may offer users the ability to move from being manually managed by the user (e.g., a manual management mode) to being managed by the database service (e.g., determining the size of a processing cluster and/or other features of the computing resources to provide access and manage the database) in order to have the database service scale or otherwise adapt the computing resources allocated to the database in order to maintain performance or efficiency goals. Techniques that perform an online restore to a different topology may be implemented may make increase the ability of users to take advantage of changing to a database being managed by the database service.

Because databases may be distributed at a topology of nodes using schemes to increase the performance and efficiency of perform access requests (e.g., queries) to the database, custom distribution schemes may be implemented. For example, a user could select one or a combination of columns or keys from tables in the database to use as distribution scheme inputs (e.g., to a hash function) in order to determine the layout of database data across a topology. A restore operation into a different topology may cause a different distribution of database data to be implemented. Therefore, techniques perform an online restore to a different topology that can recover the custom distribution of data without blocking access to the database when being moved may be highly desirable.

FIG. 1 illustrates a logical block diagram of online restore to different topologies with custom data distribution, according to some embodiments. A database system that hosts a database may utilize a processing cluster, such as processing cluster or other current topology of nodes 110 to host a database. As indicated at 112, the database data may be distributed according to a custom distribution scheme. Such a database system may be a stand-alone system, in various embodiments. For example, the database system may be implemented for private use (e.g., on private networks and resources for entity-specific utilization). In some embodiments, the database system may be a database service, which may be implemented as part of multiple different services provided by a cloud service provider, such as provider network 200 discussed in detail below with regard to FIG. 2.

A move of the database into a new node topology may be desirable, such as new node topology 120 (e.g., to resize a processing cluster to have more, or less, compute nodes or to switch from being a manually managed database to a service managed database). A restore operation may be started that sets up a new node topology, according to various techniques, such as transfer plan discussed in detail below with regard to FIGS. 4-10. For example, nodes in current topology 110 may send various metadata to nodes in new node topology 120, or nodes in new node topology 120 may access a backup version, such as snapshot of the database, to use to obtain metadata. Data for the database may be stored separately from the node topologies (e.g., in network attached storage in or a separate storage service, like storage service 270 discussed below with regard to FIG. 2). In this way, once the setup of new node topology is complete (e.g., the various metadata operations to prepare new node topology to access data as part of handling various database requests, the database can be made available for access, as indicated at the beginning of 160.

When the restore is initially performed, a general distribution of database data may be used, as indicated at 122. A general distribution scheme may, for example, apply a default distribution scheme for to determining where to physically store different portions of database data (e.g., sometimes referred to as partitions or "data slices"), that is different from the custom distribution 112. During the initial period of the restore operation, the database may be unavailable for access, as indicated at 150. However, once the initial period of the restore operation is complete, when the database data is assigned to the new node topology (e.g., node slice assignments reflect a general distribution scheme) according to a general distribution of database data 122 at new node topology 120, then a background process, as discussed in detail below with regard to FIGS. 4-20, may be performed that redistributes database data, as indicated 124, so that a custom distribution of database data 130 is achieved at new node topology 120 which matches the custom distribution scheme (but not layout as the topology is different) of custom distribution of database data 112. For example, the same one or more columns or keys may be used to determine hash values for distributing data amongst new node topology as was used in custom distribution of database data 112 (even though the number of node slices may be different in new node topology).

While redistribution 124 of database data is performed, the database may be available for access, as indicated at 160. This may allow for a restore operation with an online characteristic, as the initial period of unavailability (150) may be very short, especially when compared with the second period of availability (160). For example, the database may be unavailable for less than one minute, and then have a background process to redistribute data that lasts for one (or multiple) days. In this way, an offline restore technique that might take a long period of time (one or multiple) days where the database is unavailable, can be avoided (even if the time for performing the offline restore is slightly faster than the online technique (e.g., minutes faster)). Thus, online restore may be implemented in two different phases, as discussed in detail below with regard to FIGS. 4-10.

Please note that the previous description of node topologies, database restores, and data distributions are a logical description and thus is not to be construed as limiting as to the implementation of these features, or portions thereof.

This specification continues with a general description of a provider network that implements multiple different services, including a database service and storage service, which may implement online restore to different topologies with custom data distribution. Then various examples of the database service and storage service, including different components/modules, or arrangements of components/module that may be employed as part of implementing the services are discussed. A number of different methods and techniques to implement online restore to different topologies with custom data distribution are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
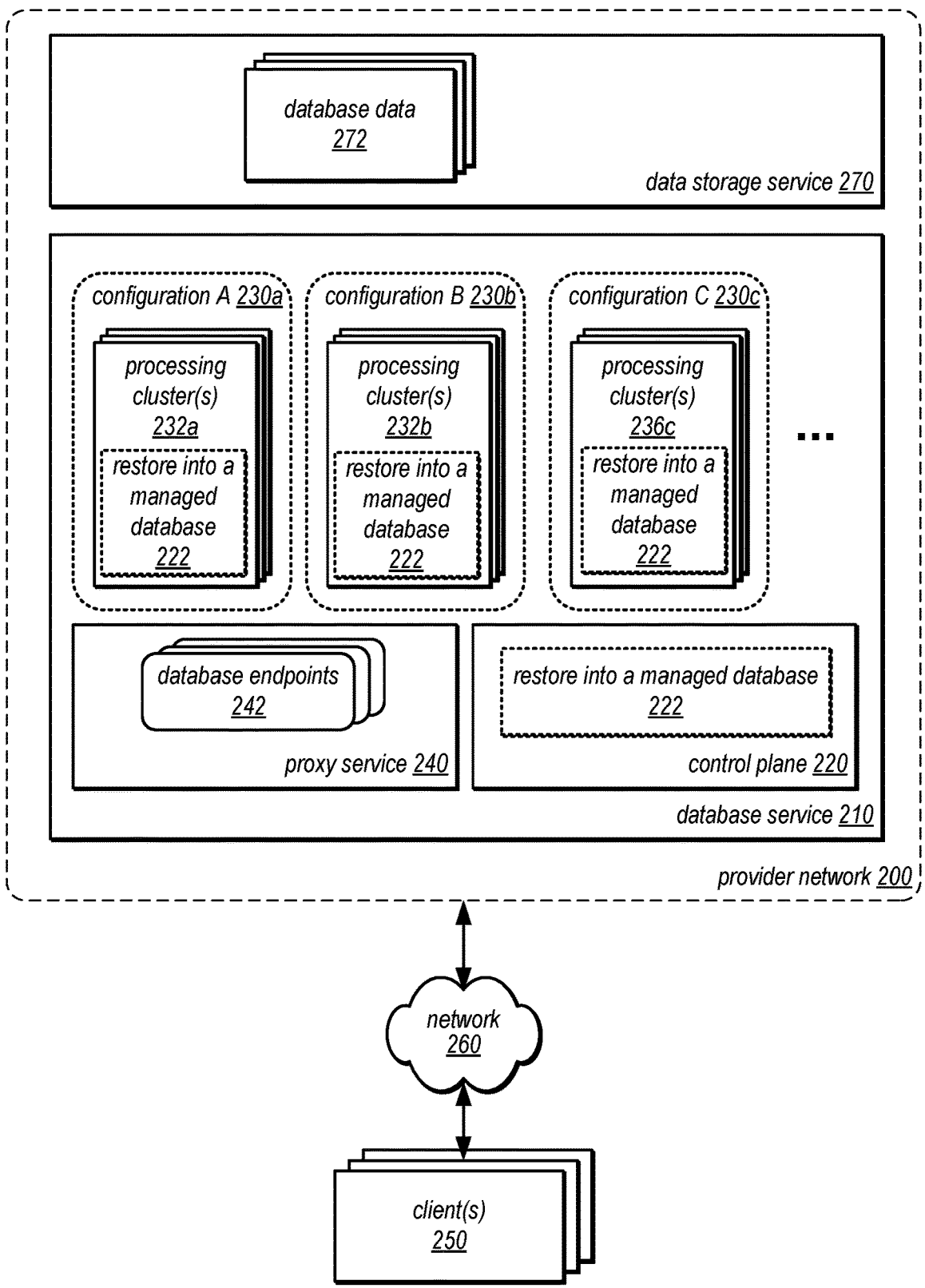
FIG. 2 is a logical block diagram illustrating a provider network offering a database service that implements online restore to different topologies with custom data distribution, according to some embodiments.

FIG. 2 is a logical block diagram illustrating a provider network offering a database service that online restore to different topologies with custom data distribution, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 11), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Users can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of users within a certain latency requirement, a set of servers provided to a user's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to users on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the cloud provider network (e.g., computing instances, containers, block storage volumes, databases, file storage). Data plane traffic generally includes non-administrative operations such as transferring user data to and from the user resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis as part of a "serverless" database that is managed by the database service instead of a user.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows database service 210 may be discussed according to the various features or components that may be implemented as part of a data warehouse service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (e.g., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 2000 described below with regard to FIG. 11. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. For example, control plane 220 may implement a restore into a managed database 222 feature as discussed above with regard to FIG. 1 and below with regard to FIGS. 4-10 and/or processing clusters 232. Control plane 220 may provide or implement access to various metrics collected for the performance of different features of database service 210, including processing cluster performance, in some embodiments.

As discussed above, various clients (or users, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data). For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to the various scaling techniques to select a different processing cluster to perform the query (e.g., in addition to or instead of scaling techniques using additional processing clusters along with the processing cluster handling the query). Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 232 (or routed/redirect/assigned/allocated to processing cluster(s)) may be directed to local data stored in the processing cluster and/or remote data. Therefore, processing clusters may implement local data processing, such as local data processing, (discussed below with regard to FIG. 3) to plan and execute the performance of queries with respect to local data in the processing cluster, as well as a remote data processing client.

Database service 210 may implement different types or configurations of processing clusters. For example, different configurations A 230a, B 230b, and C 230c, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
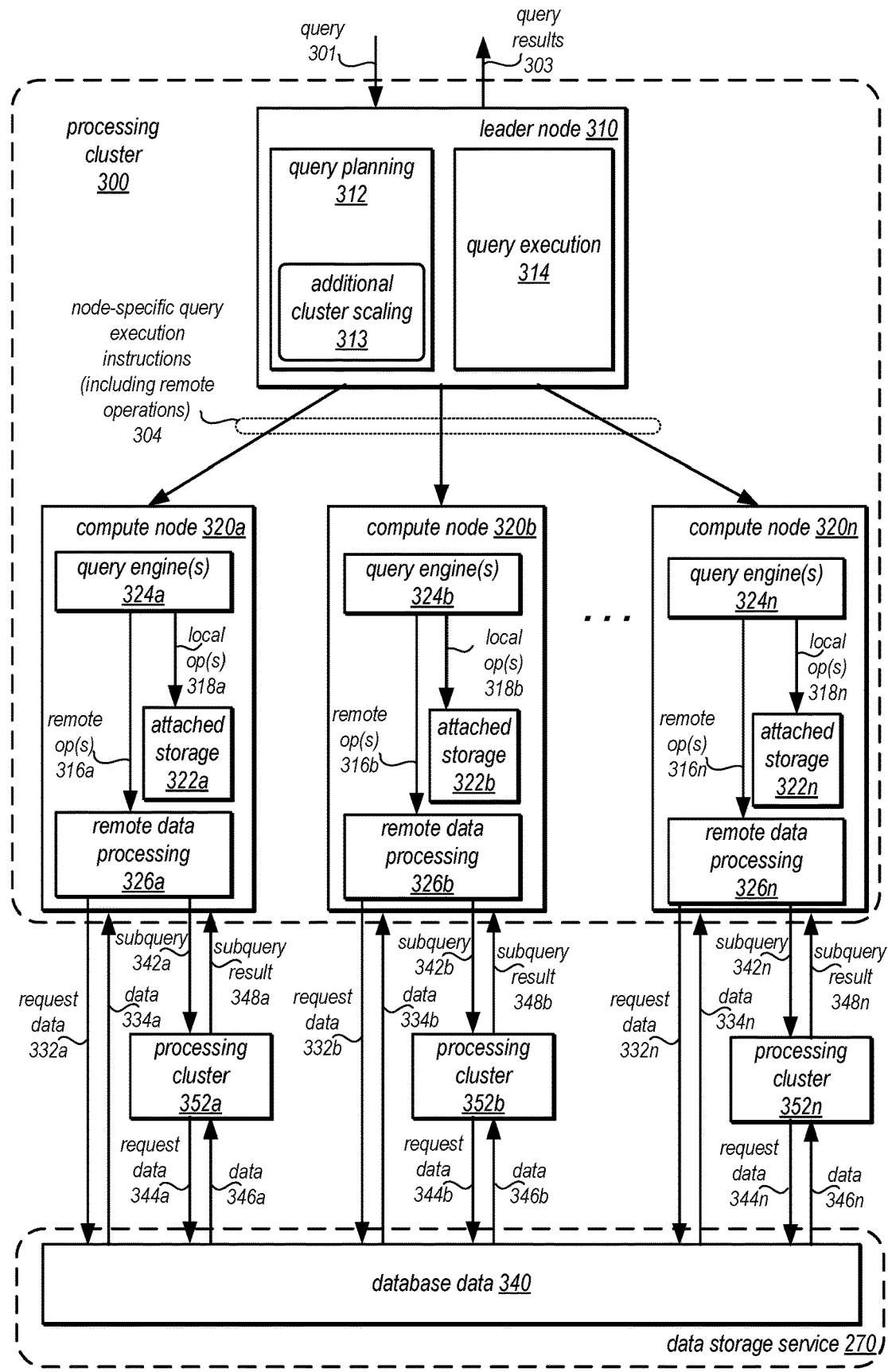
FIG. 3 is a logical block diagram illustrating an example processing cluster of a database service, according to some embodiments.

FIG. 3 is a logical block diagram illustrating an example processing cluster of a database service, according to some embodiments. Processing cluster 300 may be query processing cluster, like processing clusters 232 discussed above with regard to FIG. 2, that distributes execution of a query among multiple computational (which may also be referred to as "compute") nodes. As illustrated in this example, a processing cluster 300 may include a leader node 310 and compute nodes 320a, 320b, and 320n, which may communicate with each other over an interconnect (not illustrated). Leader node 310 may implement query planning 312 to generate query plan(s), such as generating query plans that utilize additional processing cluster scaling 313, query execution 314 for executing queries on processing cluster 300 that perform data processing that can utilize remote query processing resources for remotely stored data (e.g., by utilizing one or more query execution slot(s)/queue(s)). As described herein, each node in a primary processing cluster 300 may include attached storage, such as attached storage 322a, 322b, and 322n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 300 is a leader node as illustrated in FIG. 3, but rather different nodes of the nodes in processing cluster 300 may act as a leader node or otherwise direct processing of queries to data stored in processing cluster 300. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2. As discussed above with regard to FIG. 3, leader node 310 may communicate with proxy service 240 and may receive query 301 and return query results 303 to proxy service 240 (instead of communicating directly with a client application). Alternatively, in those embodiments where leader node 310 implements query routing as a primary cluster, then leader node 310 may act as the proxy for other, secondary clusters, attached to the database which are forwarded and perform the query, and may return query results directly to a client application.

Leader node 310 may be a node that receives a query 301 from various client programs (e.g., applications) and/or subscribers (users) (either directly or routed to leader node 310 from proxy service 240), then parses them and develops an execution plan (e.g., query plan(s)) to carry out the associated database operation(s)). More specifically, leader node 310 may develop the series of steps necessary to obtain results for the query. Query 301 may be directed to data that is stored both locally within processing cluster 300 (e.g., at one or more of compute nodes 320) and data stored remotely. Leader node 310 may also manage the communications among compute nodes 320 instructed to carry out database operations for data stored in the processing cluster 300. For example, node-specific query instructions 304 may be generated or compiled code by query execution 314 that is distributed by leader node 310 to various ones of the compute nodes 320 to carry out the steps needed to perform query 301, including executing the code to generate intermediate results of query 301 at individual compute nodes may be sent back to the leader node 310. Leader node 310 may receive data and query responses or results from compute nodes 320 in order to determine a final result 303 for query 301.

A database schema, data format and/or other metadata information for the data stored among the compute nodes, such as the data tables stored in the cluster, may be managed and stored by leader node 310. Query planning 312 may account for remotely stored data by generating node-specific query instructions that include remote operations to be directed by individual compute node(s). Although not illustrated, in some embodiments, a leader node may implement burst or concurrency scaling manager to send a query plan generated by query planning 312 to be performed at another attached processing cluster (to perform the entire query unlike processing clusters 352 discussed below) and return results received from the burst processing cluster to a client as part of results 303.

In at least some embodiments, a result cache may be implemented as part of leader node 310. For example, as query results are generated, the results may also be stored in result cache (or pointers to storage locations that store the results either in primary processing cluster 300 or in external storage locations), in some embodiments. Result cache may be used instead of other processing cluster capacity, in some embodiments, by recognizing queries which would otherwise be sent to another attached processing cluster to be performed that have results stored in result cache. Various caching strategies (e.g., LRU, FIFO, etc.) for result cache may be implemented, in some embodiments. Although not illustrated in FIG. 3, result cache could be stored in other storage systems (e.g., other storage services, such as a NoSQL database) and/or could store sub-query results.

Processing cluster 300 may also include compute nodes, such as compute nodes 320a, 320b, and 320n. Compute nodes 320, may for example, be implemented on servers or other computing devices, such as those described below with regard to computer system 2000 in FIG. 11, and each may include individual query processing "slices" defined, for example, for each core of a server's multi-core processor, one or more query processing engine(s), such as query engine(s) 324a, 324b, and 324n, to execute the instructions 304 or otherwise perform the portions of the query plan assigned to the compute node. Query engine(s) 324 may access a certain memory and disk space in order to process a portion of the workload for a query (or other database operation) that is sent to one or more of the compute nodes 320. Query engine 324 may access attached storage, such as 322a, 322b, and 322n, to perform local operation(s), such as local operations 318a, 318b, and 318n. For example, query engine 324 may scan data in attached storage 322, access indexes, perform joins, semi joins, aggregations, or any other processing operation assigned to the compute node 320.

Query engine 324a may also direct the execution of remote data processing operations, by providing remote operation(s), such as remote operations 316a, 316b, and 316n, to remote data processing clients, such as remote data processing management 326a, 326b, and 326n. Remote data processing management 326 may be implemented by a client library, plugin, driver or other component that sends request sub-queries to be performed by data storage service 270 or requests to for data, 332a, 332b, and 332n. As noted above, in some embodiments, Remote data processing management 326 may read, process, or otherwise obtain data 334a, 334b, and 334c, in response from database data 340 in data storage service 270, which may further process, combine, and or include them with results of local operations.

In some embodiments, remote data processing may utilize additional processing clusters, such as additional processing clusters 352a, 352b, and 352n to perform respective subqueries, such as subqueries 342a, 342b, and 342n, according to instructions generated in accordance with query plans that include remote operations to use additional processing clusters. These subqueries 342 may be formatted according to a query language or other interface which may be the same as used to receive query 301, in some embodiments, as processing clusters 352 may implement the same query processing engines as the primary cluster (e.g., processing cluster 300). Processing clusters 352 may request data, as indicated at 344a, 344b, and 344n, in order to obtain data from database data 340 in data storage service 270, as indicated at 346a, 346b, and 346n. Processing clusters 342 may then perform the subqueries using the received data and return respective results, as indicated at 348a, 348b, and 348n.

Compute nodes 320 may send intermediate results from queries back to leader node 310 for final result generation (e.g., combining, aggregating, modifying, joining, etc.). Remote data processing clients 326 may retry data requests 332 that do not return within a retry threshold.

Attached storage 322 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
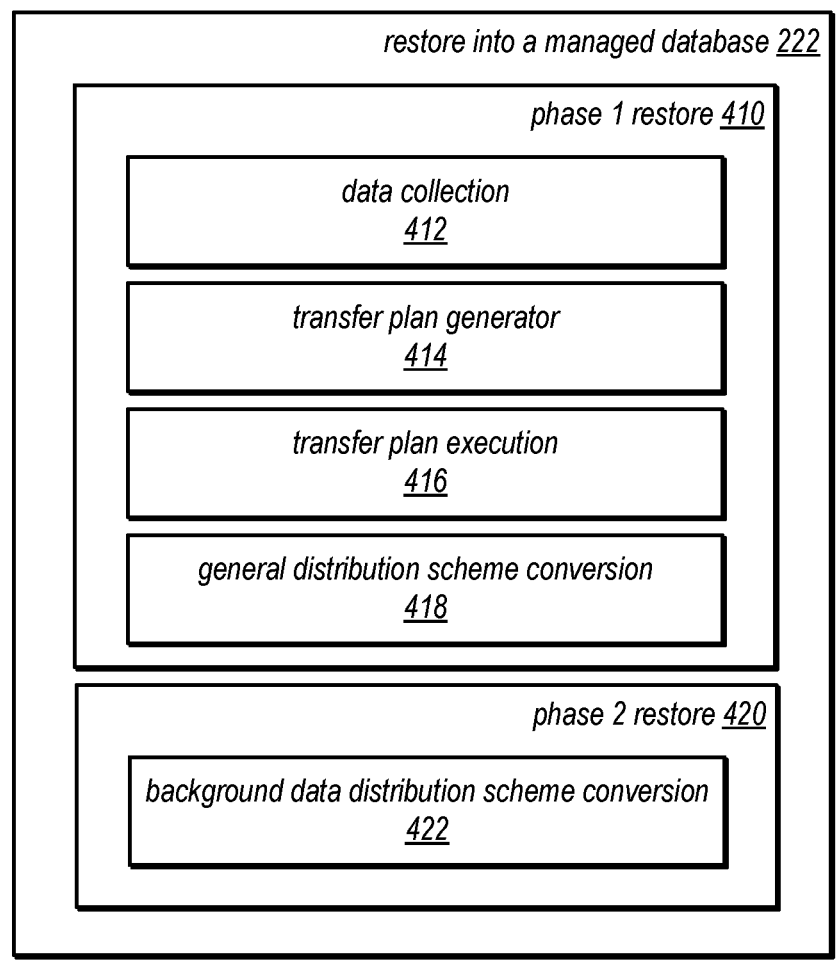
FIG. 4 is a logical block diagram illustrating a restore into to a managed database feature offered by a database service, according to some embodiments.

FIG. 4 is a logical block diagram illustrating a restore into to a managed database feature offered by a database service, according to some embodiments. Note some (or all) of these features may be implemented on processing clusters directly, or in combination between control plane 220 and processing clusters 232. Restore into managed database 222 may allow for clients to request (e.g., via control plane interface request or directly to a processing cluster) a change from a database being manually managed at a user configured processing cluster into a managed database, which the database service configures and otherwise manages to dynamically adapt computing resources allocated to the database, as discussed above with regard to FIGS. 2 and 3. As discussed in detail below with regard to FIGS. 5-10, a transfer plan may be performed to determine how to transfer data in a current topology (e.g., a number of data slices on one or more different compute nodes with a number of node slices) to a new topology selected for the database by database service 210.

As discussed above with regard to FIG. 1, online restore may include two phases. Phase 1 restore 410 may include features, such as data collection 412 to collect a database manifest (e.g., database files or other data objects storing database data) and other information describing a database, such as metadata that describes the database schema, superblocks that describe the contents or arrangement of data, etc., as discussed below with regard to FIGS. 5, 8 and 9. As indicated at 418, a general distribution scheme conversion may be applied as part of the phase 1 restore 410 when storing data in a new topology (e.g., a new processing cluster).

Phase 2 of online restore 420 may include background data distribution scheme conversion 422, as discussed in detail below with regard to FIGS. 5, 6, 8 and 10.

In some embodiments, pause, retry, and resume techniques may be implemented for background data distribution scheme conversion 422 so as not interfere with database access requests.

For example, the following pseudo-code describes one such technique using checkpoints:

```
struct TaskStats {
    // Statistics on    task interruption   and score
    //calculation
    // To be introduced
}
def UPDATE_PRIORITY_SCORE(task):
    // TO be introduced later
def SimulateWorkerBehavior(task):
    // In reality a worker will randomly chosen between
    1. Task   INTERRUPTED
    // TaskStats get updated accordingly
    UPDATE_PRIORITY_SCORE(task,  IsCKPDestroyed)
    2. Task   FINISHED
    3. Task   CHECKPOINTED
    task.CKP  += 1
def Exhuast(candidate_list,  retry_list): """
    Exhuast the  ongoing lists   until all tasks are either
    completed or   moved to retry list
    retry_list  is an ordered set which maintains the sortness
    of the task based on the backoff score.
    """
    while candidate_list:
    task =  candidate_list.back( )   // Get task from the
    back of the list
    res =  SimulateWorkerBehavior(task)
    switch res:
    case INTERRUPTED:
    retry_list.add(task)
    case FINISHED:
    candidate_list.remove(task)
    case CHECKPOINTED:
    do nothing
def Refill(candidate_list,  retry_list):
    Dump  the retry list to the ongoing list and preserving
    the sortness
    ongoing list =   [ task with the biggest priority score
    ... task with the smallest
def main( )
    candidate_list  =  [all tasks]
    retry_list  =  ordered_set( )
    while   candidate_list:     Exhaust(candidate_list,
    retry_list) Refill(candidate_list,  retry_list)
```

In some embodiments, a priority score may bused to determine how to pick tasks to work on in the background (e.g., by picking the task with the lowest score for the next round of conversion). For example, given a restore operation, some metrics may be observed, such as INT: num of time get interrupted, CKP: when interrupted, it is in its #CKP-th checkpoint (1-based), and IsCKPDestroyed: whether the interruption leads to the loss of checkpoint. This may allow us to determine a priority score by:

```
def PRIORITY_SCORE(CKP,  INT,  IsCKPDestroyed):
    INT  +=  (CKP+1)  if IsCKPDestroyed else 1
    CKP  =   0 if IsCKPDestroyed else CKP
    return INT
```

In some embodiments, techniques for online restore may include the following features. 1 Import data from clusters with different topology than the managed (sometimes referred to as "serverless") cluster. 2. Import data from unencrypted clusters or from clusters with dissimilar encryption keys, into encrypted Serverless endpoint. 3. Import data operation has to be fast. Database service 210 may support restoring snapshot across instance types, e.g. user can restore a snapshot taken on a first topology of a cluster with a particular configuration (e.g., varying numbers and/or hardware or software capabilities of compute nodes in a cluster) to a cluster with a second, different topology and vice versa.

One of the features for migrating existing clusters to a serverless management mode is that the cluster may need to be ready immediately for read-write access, which could rule out using offline restore as it can take significantly long time to migrate. To provide the feature of faster migration into a serverless management mode across different topologies, in some embodiments, online restore techniques may be used for migrating snapshots into a serverless management mode.

Figure 5:
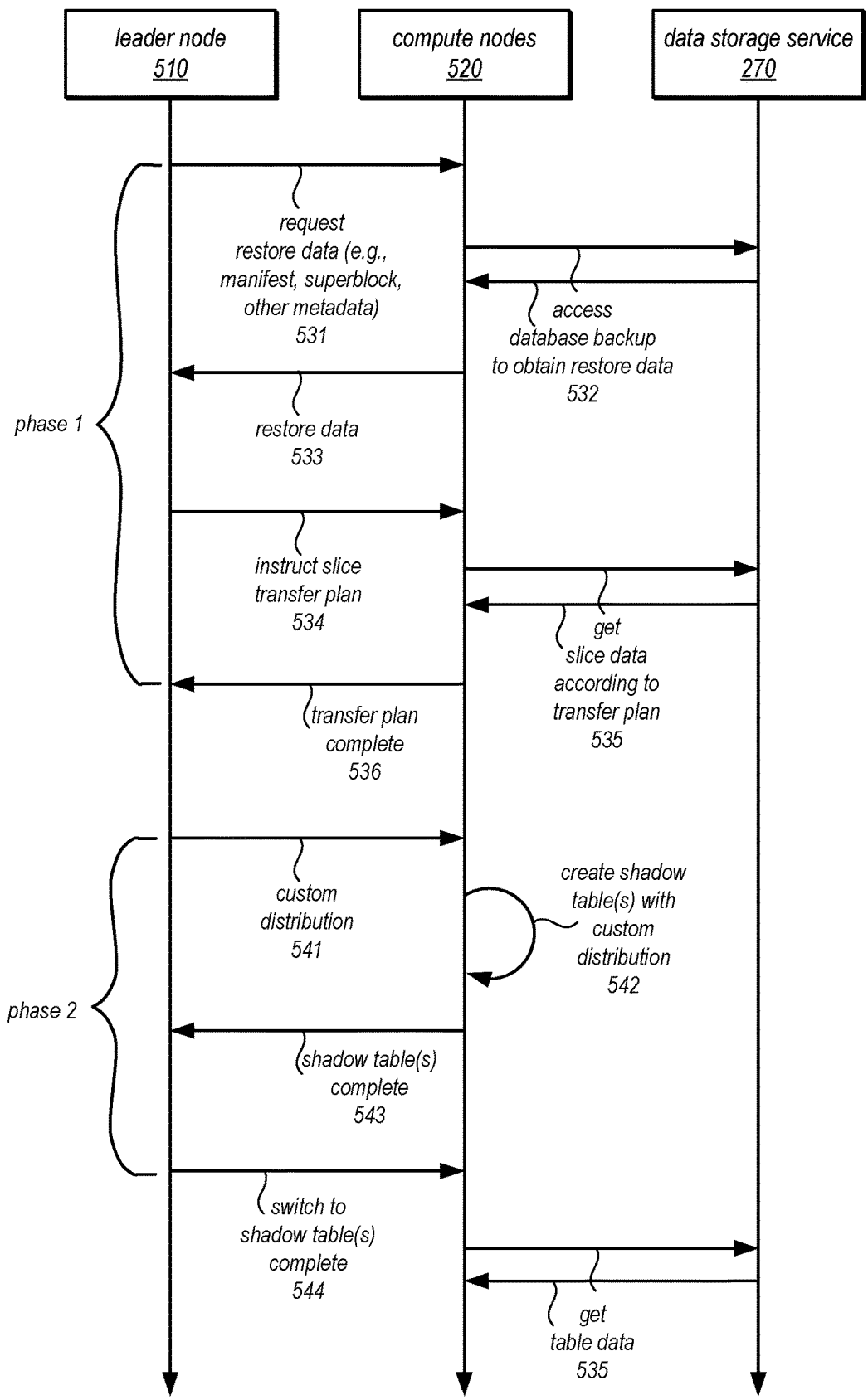
FIG. 5 is a logical block diagram illustrating interactions to perform online restore to a different cluster topology, according to some embodiments.

As discussed above, a manifest, such as BAR (Business Archive) manifest, may be used to store information about the layout and location of database data (e.g., in a snapshot or other storage location. FIG. 5 is a logical block diagram illustrating interactions to perform online restore to a different cluster topology, according to some embodiments.

Leader node 510 may be a leader node of a processing cluster, as discussed above with regard to FIGS. 2 and 3. In some embodiments, leader node 510 may implement a separate restore management process, function or feature, such as a restore controller. Compute nodes 520 may be may be implemented similar to compute nodes that are part of a processing cluster, as discussed above with regard to FIGS. 2 and 3. Like leader node 520, compute nodes 520 may implement a separate process, function, or feature, such as a restore worker to perform various operations related to online restore.

As part of phase one of online restore, leader node 510 may request 531 restore data, such as a manifest (e.g., BAR manifest), superblock, and/or other database metadata) from compute nodes 520. Compute nodes 520 may be able to send one (or more) access requests to obtain the restore data, as indicated at 532, from data storage service 270. For example a backup file, storage location, or other set of one or more data objects may include the restore data and may be read or otherwise obtained. Compute nodes 520 may separate or extract the restore used by leader node 520, such as various database metadata or other information used to coordinate performance of queries, and return it to leader node 510, as indicated at 533.

Consider one example embodiment where a leader node may communication with a designated compute node, Compute Node 0 of a processing cluster, that will download a superblock (SB) and fetch the LeaderSnapshot and write ahead log (WAL). Then, the leader node may retrieve the LeaderSnapshot from Compute Node 0 and reconstructs the entire database catalog. The imported catalog may contain all entities (databases, schemas, tables, views and global metadata) that existed on the previously provisioned cluster (with the different topology). The imported entities retain the object identifiers (OID's) that existed on the provisioned cluster. At the end of the initial restore, the last committed Transaction ID recorded in the previously provisioned cluster's snapshot will be the base TransactionID that the new processing cluster will start from.

Figure 6:
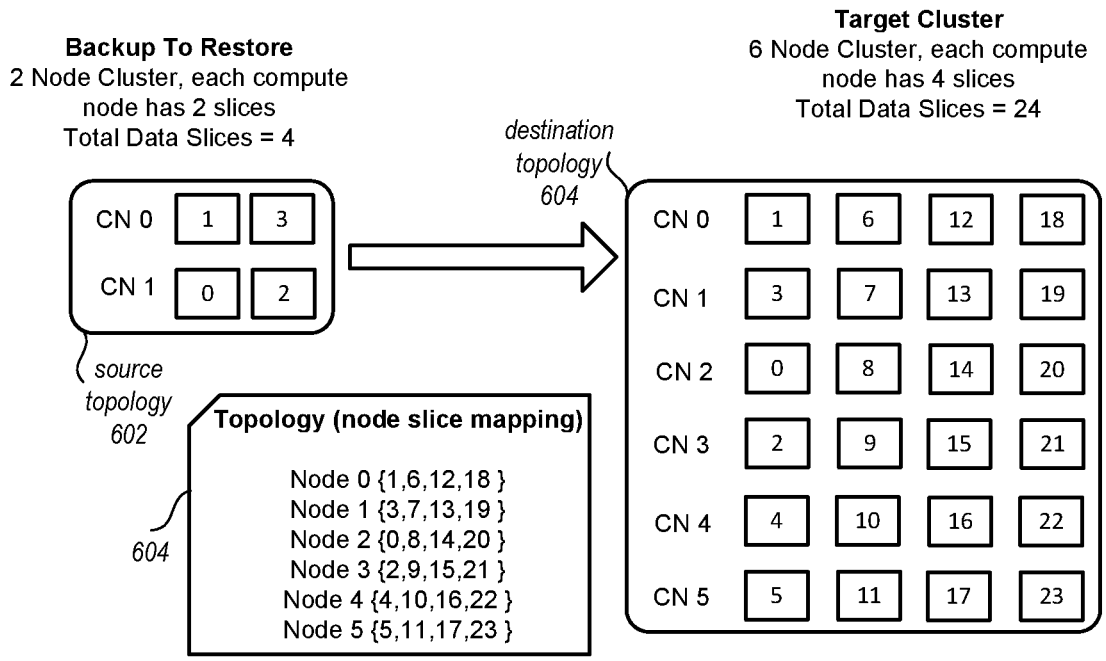
FIG. 6 is a logical block diagram illustrating example scenarios of different topologies with different transfer plans, according to some embodiments.
Figure 6:
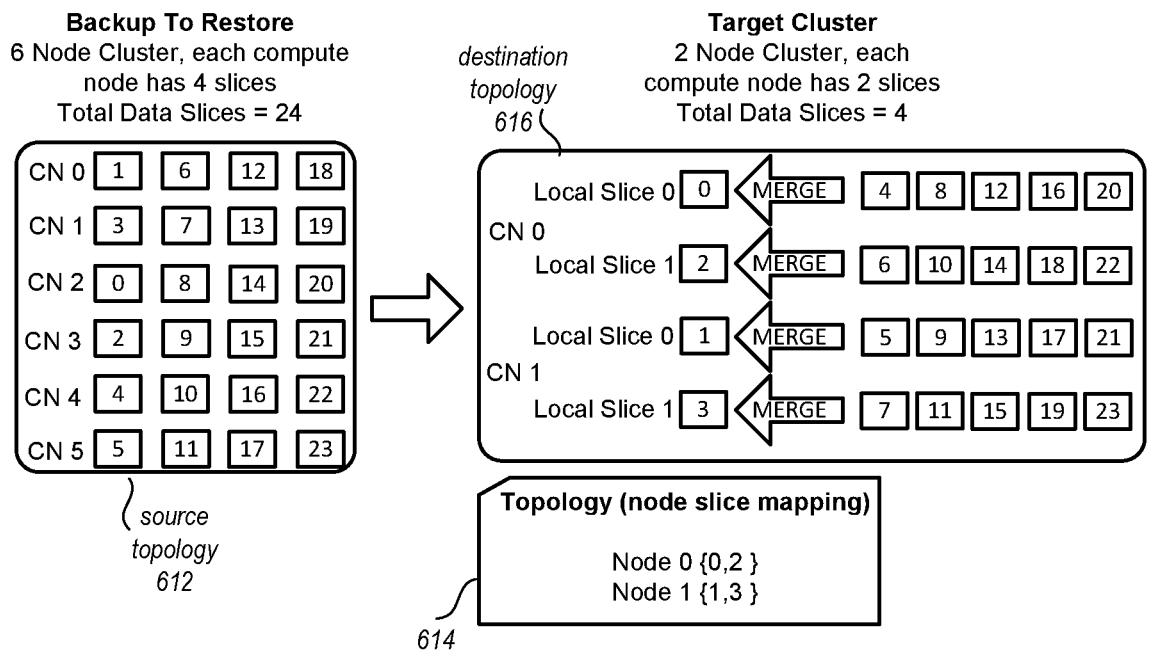

As discussed above with regard to FIG. 4, a transfer plan using a general distribution scheme may be implemented to generate instructions to transfer database data into a target cluster, which may have a different topology. FIG. 6 is a logical block diagram illustrating example scenarios of different topologies with different transfer plans, according to some embodiments.

For example, the restore plan consists of steps describing how the slices will be migrated from the storage service 270 backup into the restored cluster. Each step in the restore plan contains producer and consumer node numbers for a given global node slice, and the local node slice # on target compute node where the incoming source global slice is being transferred. An example restore plan:

```
{
    "backup_id" : "abcde",
    "old_cluster_size" : 3,
    "new_cluster_size" : 5,
    "num_steps" : 14,
    "steps" : [
        /// For CN0 on restored cluster
        {
            "src_node" : 0,
            "src_slice_num" : 0,
            "dst_node" : 0,
            "dst_slice_nume" : 0
        },
        ...
        /// For CN3 on restored cluster
        {
            "src_node" : 1,
            "src_slice_num" : 3,
            "dst_node" : 3,
            "dst_slice_num" : 1
        },
    ]
}
```

The generated restore plan is serialized and broadcasted to each of the compute nodes. Compute nodes use the restore plan to download the necessary incoming source superblocks from storage service 270 and perform the slice transfer operation.

To migrate across dissimilar topologies and in specific perform data import onto the target cluster topology, the restore slice transfer plan may be modified to perform generation to handle the following additional scenarios. Scenario 1: Number of slices in the snapshot is less than the number of slices on target cluster. To handle this scenario, distribute the global slices in a round-robin fashion from source topology 602 to destination topology 606 as indicated in mapping 604 onto the available target compute nodes taking into account the data skew across nodes. The empty/unoccupied slices are going to be added to the node-slice mapping during topology generation form the restore slice transfer plan.

Scenario 2 illustrates that a number of node slices in the source topology 612 is greater than the number of node slices on the destination topology 616. To handle this scenario the global data slices [0, N] may be initially placed that are valid on the target cluster in a round-robin fashion, taking into account the data skew across nodes, as indicated in mapping 614. Then, the extra global data slices [N+1, K] may be placed from the source cluster on target in a round-robin fashion. These extra global slices are going to be merged to the global node slices [0, N] on the target cluster.

In some embodiments, during the slice transfer phase based on the restore slice transfer plan, each target compute node downloads the relevant source metadata (such as a superblock) from storage service 270. Table blockchains of relevant data slices are extracted from the downloaded source superblock and then grafted into the live superblock, after making necessary adjustments (e.g. a node slice that is owning the blockchain etc.).

Once the table blockchains are grafted into the live superblock, the metadata transfer phase may start. During the metadata transfer phase, transfer of the following metadata types from the snapshot to the restored cluster may be performed: ActiveXid: Storage engine has a list of pairs <transaction ID, table ID> for transactions that are uncommitted and the tables associated with those transactions. During restart, run UNDO on these transactions, and X-Restore will do the same operation. Compressor: Contains the metadata relevant for interleaved sortkeys on a given table. Identity metadata: Contains the identity watermark for each of the identity column blockchains. This is the maximum identity value for each identity column, table, slice. Tiered storage cache lists (Hot and Cold): FDisk has the list of blocks and their states in the cache, namely Cold Untouched, Cold Touched, Hot Untouched, Hot Touched. After the restore, this list would be populated in FDisk for each target node. Table partition metadata: This metadata is used for auto vacuum sort and contains partition information (like row count and flags) for all partitions of each table, slice pair.

In order to support the scenario where the number of data slices in the snapshot is greater than the number of node slices on target cluster, an extra step may be performed during slice transfer phase to support 1. Merging permanent table blockchains. 2. Merging or recreating the relevant slice wise metadata.

Merging Permanent Table Blockchains: Slice transfer in cross instance restore involves, serializing data slice block headers from downloaded source superblock followed by deserialization process where the block headers are grafted into live superblock and update table registry. During serialization phase, fetch the starting offset of the perm table blockchain and copy the source blockchain, from the downloaded superblock, into a destination buffer (which is a segmented superblock). During the deserialization phase, extract the table blockchains from the serialized superblock. The extracted blockchain is then added into the live superblock on the target compute node. Then transformation may be performed on the grafted blockchain to update a) new node slice owning the block, b) disk address and preferred disk no, c) guid rename if necessary etc., Once the blockchain transformation is complete, hookup the blockchain to the relevant table-data slice-column.

The above is the current behavior during the slice transfer of table blockchains, in order to support the slice merging operation, use the following extra steps—1. If the table-slice-column blockchain is not empty during grafting (e.g. already attached a blockchain to this slice)—a. Append the blockchain to the existing blockchain. b. Mark all the blocks in the appended blockchain as unsorted. c. Remove empty block after sorted region during append operation. 2. If the column is a row id column, in addition to step 1-*a*. Update the last rowid in table perm to be the max of all seen rowids. b. Persist the max rowid value per slice in the blockchain metadata. c. Reestablish the starting row id value on each data slice during database engine restart, from the persisted metadata. 3. If the column is a identity column, in addition to step 1-*a*. Persist the max identity value per slice in the blockchain metadata. b. Reestablish the starting identity value on each data slice during database management system (DBMS) restart, from the persisted metadata. Table blockchain merge operation would be only necessary for non dist-all tables. DistALL tables are only grafted once on a given compute node local slice 0.

In various embodiments, etadata transfer in cross instance restore involves, serializing the internal metadata from downloaded source superblock followed by a deserialization step where hookup of the metadata is performed. In order to support the scenario where the number of slices in the snapshot is greater than the number of slices on target cluster, merging or recreating may be supported for the relevant slice wise metadata. Below is a description of how to handle this operation per metadata type—ActiveXid: Is cluster wide metadata and no additional changes are required to support slice merge operation. Compressor: Rebuild the z-compressors as the sortedness of the table is modified after slice merge operation. Identity metadata: Set the identity high water mark for the target node slice to be max of merged source data slices. Leader to reestablish the identity values across data slices (e.g. identity value a slice to generate) after the metadata merge operation. Table partition metadata: Retain the table partition info of the initially grafted slice, discard partition metadata from merged data slices. Tiered storage cache lists (Hot and Cold): populate tiered storage cache by iterating hot list across incoming nodes followed by cold list.

In some embodiments, encryption may be handled as part of performing an online restore. For example, encryption handling may be implemented in phase one of online restore, according to some embodiments. When users use a key management service (KMS) of provider network 210 for key management with Database service 210, there is a four-tier hierarchy of encryption keys. These keys, in hierarchical order, are the master key, a cluster encryption key (CEK), a database encryption key (DEK), and data encryption keys (block level keys). Database Encryption Key (DEK): The AES256 key, control plane will pass to DBMS on startup. Trent Wrapper Key (TWK): Encrypts the DEK and stored in AdminDB. The TWK is generated using the KMS, KMS Key (KMS): The key that lives in KMS. The KMS key does not leave KMS, so encrypt/decrypt using the KMS key by calling the KMS APIs Encrypt and Decrypt. Additional key (O): An additional key may be used to encrypt all sensitive data in AdminDB. This isn't really necessary from a security standpoint, but in order to keep all of the records in the ENCRYPTION_KEY column in the DB_INSTANCES table consistent, also use the additional key in our hierarchy.

Below is one example of a sequence of actions for handling encryption during the restore operation—
1. Start DBMS in Restore mode using—
   a. cqi restore <backup_id> <Key1: DEK from the source snapshot> <key2: NotAValidKey>
2. Start DBMS in Restore Bootstrap mode using—
   a. cqi xstart—restore-bootstrap <Key1: DEK from the source snapshot> <Key2: Newly Created Cluster DEK>
3. Perform Key Rotation using—
   a. cqi rotate_key <Key2: Newly Created Cluster DEK>
   b. During Key Rotation, decrypt per data block key using the original DEK and re-encrypt using the new DEK.

Key rotation does not require re-encrypting the data block and its only metadata (Block Header update) operation. The only place re-encrypt of the data block is currently performed is when cross-account restore is performed or when modification of the GUID of the data block is performed. Since GUID is used as the encryption key while encrypting the data block, modifying this would require re-encrypting the data blocks.

To support restoring an unencrypted snapshot into an encrypted cluster, the following features may be implemented. 1. Control plane will pass a new flag "-snapshot-not-encrypted" to indicate snapshot is not encrypted to data plane. 2. Control plane will pass the newly created cluster DEK in the restore phase-1 itself, this is required by data plane to start the cluster with a valid encryption key and generate the block keys.

Here is an example of how the interface would look—

```
Restore phase - 1:
   cqi restore <backupId>
   NotAValidKey Key2: Newly Created Cluster DEK
      -use-target-topology
      -snapshot-not-encrypted
Restore bootstrap mode:
   cqi xstart -f -restore-bootstrap
      -key1 <Key1: Plain string "NotAValidKey">
      -key2 <Key2: Newly Created Cluster DEK>
      -use-target-topology
      -restart-reason <xyz>
Rotate Key (no-op from DP side for first time):
   cqi rotate_key <Key2: Newly Created Cluster DEK>
```

To support restoring an unencrypted snapshot into an encrypted cluster, the following features may be implemented in various embodiments. Start the restored cluster using encryption key 2 (e.g. the newly created cluster's DEK) and use it as root key. Rename GUID and assign new block key for data blocks restored from unencrypted snapshot. Track blocks restored from unencrypted snapshot, until perform encryption state changes.

Use Encryption Key 2 as root key on the restored cluster. In the default encrypted snapshot restore case, start the cluster with Key1 (e.g. the DEK of the source cluster) and use this Key1 to download the superblock, decrypt the data blocks etc. Then switch to Key 2 when the key rotation happens. Key1 is not a valid key (as it does not even exist) when restoring an unencrypted snapshot, so use the valid Key2 to start the cluster. During the initial cluster creation (prior to x-restore slice transfer), compute nodes are started with encryption Key 2 and the "m_enc_key_hash" in superblock mid will store the hash of encryption key 2.

Leader and compute node's both use valid encryption key 2 as the clusters root key (Xen→m_root_key), from the restore phase-1 itself. Rename GUID and assign new block key for data blocks restored from unencrypted snapshot During restore with encryption state change, rename the GUID's of the blocks and also reset the storage service flag. This is required to re-upload the block with new GUID after encryption. To support this, API's ShouldRestoreClearInstorage service 270 Bit( ) and ShouldRestoreRenameBlockGuid( ) may return true, when performing a x-restore with encryption state change.

Then a new block key may be assigned for all the data blocks restored from an unencrypted snapshot. This step may be performed to make sure, when the block is eventually written out either by backup or re-replication, that the same block key is used to encrypt the data block.

Renaming the block GUID and assigning the new block key happen during the slice transfer post processing during x-restore phase-1.

Restored blocks may be tracked that require encryption state change by setting BlockNeedsEncryptionStateChange flag inside the block header flags field. This would be the bit 26. BlockNeedsEncryptionStateChange indicates that while reading this block do not need to decrypt, but while writing this block out (either by backup or re-replication) may need to write it as encrypted. BlockNeedsEncryptionStateChange flag is cleared in the following paths—
   Re-replication write IO completion, as the block is encrypted with valid key.
   Backup completion and while marking in_storage service flag and block is still underrepped.

Clear in this path as subsequent accesses will fetch new GUID block from storage service 270 which is encrypted.

Classic/X-Restore/Elastic-resize/Burst where a backup is taken and encryption state change performed.

This flag may be retained for workflows which have not yet performed the state change—

Disaster Recovery from last storage service 270 Commit

Data sharing from storage service 270 Commit.

Burst if based of storage service 270 Commit.

Figure 9:
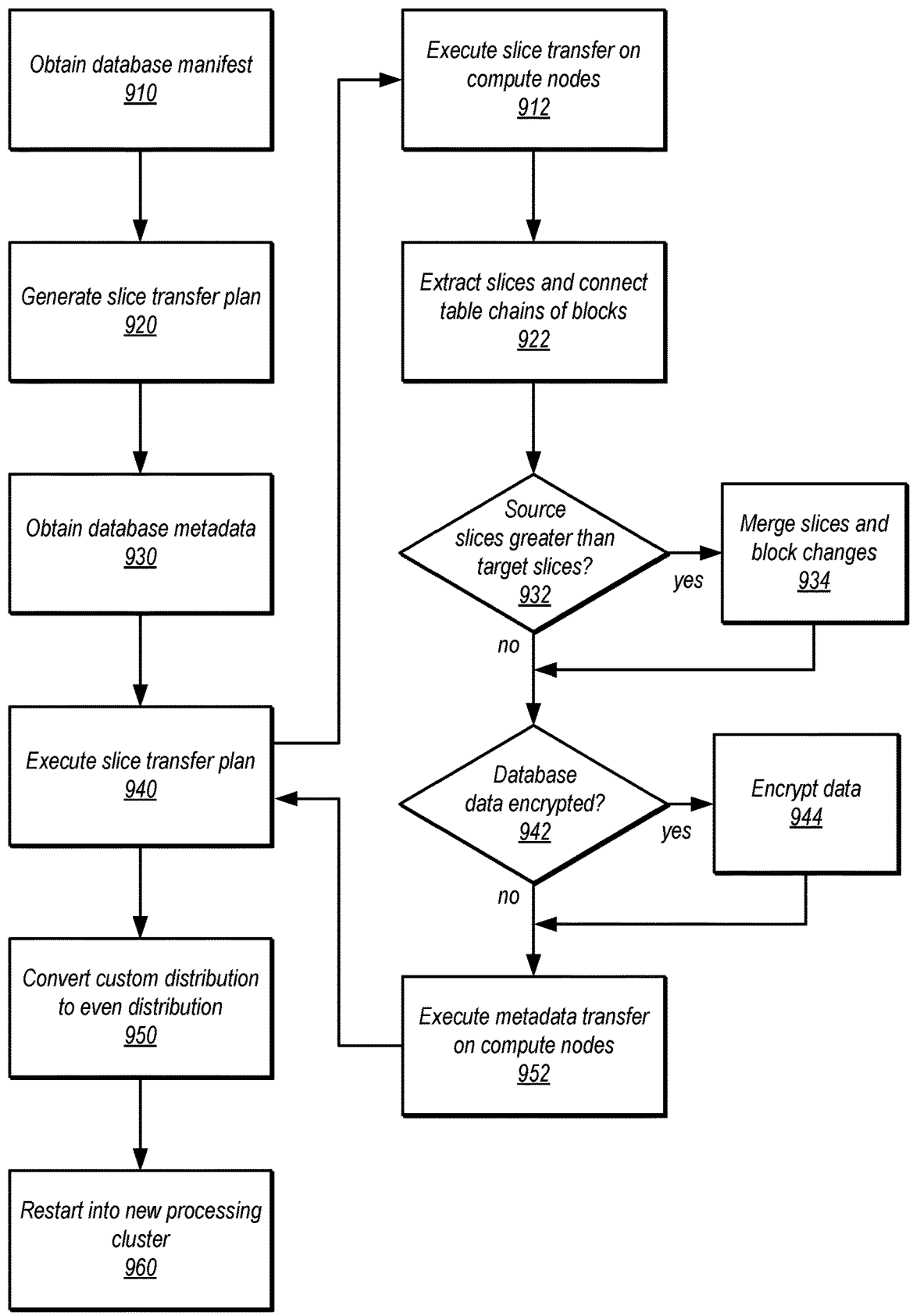
FIG. 9 is a high-level flowchart illustrating methods and techniques to implement phase one of online restore, according to some embodiments.

Tagging blocks that require encryption state change with BlockNeedsEncryptionStateChange, would enable us to operate the cluster in read-write mode, where newly ingested blocks are already encrypted and restored blocks are being encrypted in the background. FIG. 9 is a logical block diagram illustrating interactions to make an encryption state change, according to some embodiments.

BlockNeedsEncryptionStateChange bit may be introduced in the block_hdr flag to track blocks yet to be encrypted. For blocks with this flag set, do not decrypt the block and read it as is and while writing the block encrypt using the valid key.

In order to support restoring an unencrypted snapshot into serverless, there are few modifications implemented from both control plane and data plane side—1. Control plane has to pass a new flag to notify data plane that the snapshot is unencrypted. 2. Data plane has to treat this restore as a special case (similar to cross account), where re-guid all the blocks. Current if a block is marked as requiring re-guid, decrypt the block using the original GUID and then re-encrypt it using the new GUID. In this special case, may not need to perform the decrypt operation as the original cluster is unencrypted.

Once phase 1 is completed, as indicated when a transfer plan complete indication 536 is received at leader node 510 from compute nodes, phase 2 restore may begin as a background process in order to avoid interfering with database access. For example, leader node 510 may initiate work to implement a custom distribution (e.g., according to a distribution key), as indicated at 541, at compute nodes 520. To allow client access with minimal downtime, compute nodes 520 can use an automatic table optimization infrastructure to convert distribution to the custom distribution, such as using techniques to create shadow tables, as indicated at 542 and discussed in detail below with regard to FIG. 7.

For example, leader node 510 may trigger an automatic table optimization process to start converting a dist-key table of new source clusters to a new cluster's topology. Automatic table optimization may launch several processes or threads to work on these new shadow tables in parallel in a special workload management queue (which may have a budgeted or capped resource allocation).

Figure 7:
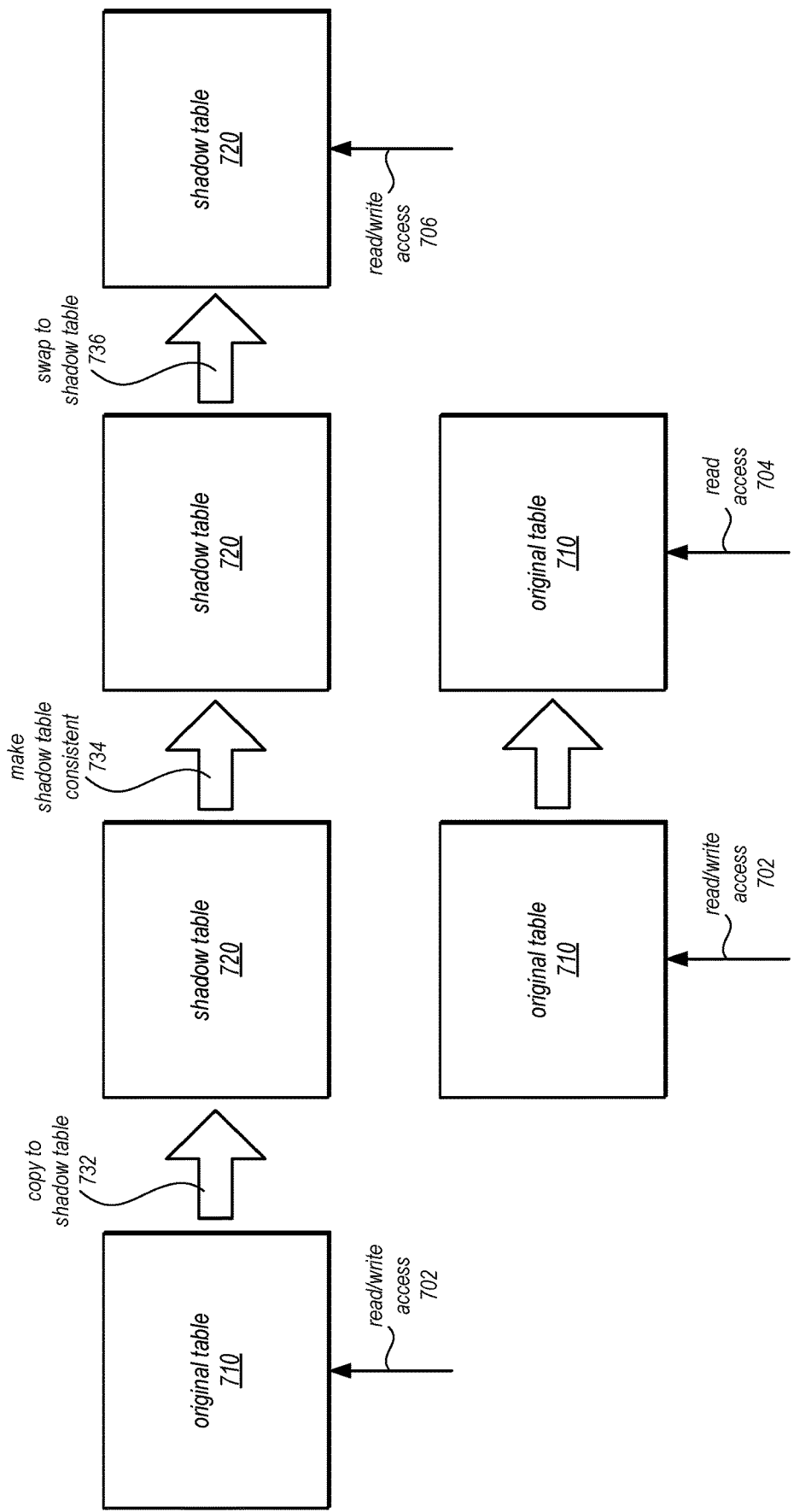
FIG. 7 is a logical block diagram illustrating the use of shadow tables to perform online restore, according to some embodiments.

FIG. 7 is a logical block diagram illustrating the use of shadow tables to perform online restore, according to some embodiments. Original table 710 may be used at various compute nodes 520 to copy and create shadow table 720. Original table 710 may still be available for read and write access, as indicated 702. Then, shadow table 720 may be made consistent, by locking original table, to only allow read access 704, applying (or undoing) various transactions that are not committed, or otherwise performing various operations to bring shadow table into a consistent state with original table 710 (although with a custom distribution style for the new topology). Then, as indicated at 736, the original table may be swapped with the shadow table 720, where shadow table 720 is now used to provide read and write access 706 on the cluster.

For example, leader node 510 should get the hotness information of all newly imported dist-key tables to determine the priority of these new tables. These information can be collected from the tiered-storage cache policy and the hotness can be simply determined from the percentage of blocks are hot or cold of each table. The converting process should cover both dist-key assignment and topology change. This means automatic table optimization should assign the original dist-key back to target table and transform target table to Serverless cluster's topology at the same time.

Once a table is completed, automatic table optimization may update catalog properly so that automatic table optimization wouldn't revisit this table again, and planner and query execution can recognize them properly.

Automatic table optimization may change a table's distribution style, sortkey and encode types to improve user's workload performance without affecting user's workload. While automatic table optimization is running on a table, a user is still able to execute read and write queries on it. Automatic table optimization may catch up with user's concurrent update through a shadow table, as illustrated in FIG. 7. Below is example technique for working on a shadow table:

1. Copying data from source table to its shadow table, which has different distribution style.
2. Checkpointing the current amount of data copies at the end of each iteration.
3. Blocking background vacuum/ALTERs from running on table under ATO's operation.
4. Acquiring write-lock when most data of source table is copied to shadow table and performing synchronization between source and shadow table:
   a. Redo deleted rows, and
   b. Undo aborted transactions
5. Acquiring access-exclusive-lock during commit to avoid race condition of the concurrently session that is accessing the source table.
6. Swapping blockchain between source and shadow table.

In some embodiments, further features may be implemented as part of automatic table optimization in phase 2 of online restore. For example, in some embodiments during restore, record pair map from catalog with <table_id, a_dist_key> if table's diststyle is DistStyleHash. Automatic table optimization may prioritize topology conversion based on table hotness for in pair map. The hotness information can be derived from tiered storage cache policy. Add this priority based benefit to each automatic table optimization that got launched. Concurrent Conversions and Hotness-based Scheduling: automatic table optimization only supports altering one table's distribution style at a time. To maximize the throughput of table conversion, DBMS may make a change to enable automatic table optimization to keep track of multiple tables status. Modify Auto Dispatcher to spawn multiple automatic table optimizations for importing in separate of automatic table optimization for recommendation per database, record map<table_id, <pointer to automatic table optimization worker, alter controller>> where automatic table optimization pointer is used to control the worker itself, and alter controller is to control alter progress, store them in map. Pause and resume the automatic table optimizations according to the workload. Tiered Storage Cache Pollution with automatic table optimization. Do not record automatic table optimization pinned blocks into TS cache calculation, only record the automatic table optimization blocks are on local disk. In case of concurrent conversion, set quota to how many memory all automatic table optimizations can share, if used up, automatic table optimization either wait, or move on to the next eligible (smaller table).

In some embodiments, database service 210 may setup a special workload management queue that allows automatic table optimization to consume sufficient amount of resources (for example, up to 50% of cluster resources) to finish it job.

Other features may include, blocking all other auto workers on this table during conversion, sorting Range during conversion, monitoring metrics, providing automatic table optimization progress and showing in console, implementing a system table log for user to query the automatic table optimization progress, providing an upper limit (few million) of redo deleted rows per compute node. If user deleted too many rows on the target table of automatic table optimization, automatic table optimization has to give up and retry.

In various embodiments, automatic table optimization uses shadow table to contain the data with new distribution. It means there will be two copies of same table at the last stage of conversion. To resolve this scenario, either the in-place distribution transform or build the redistribution on a cluster may be performed. In various embodiments, in-place redistribution may be performed where the database management system (e.g., of a leader node) copies+redistributes data, splits original blockchain, and replaces the copied blockchain in original table. Thus, there may not be a need to create full copy of target table. In various embodiments write redistribution may be performed where the database management system uses burst cluster to finish whole data re-distribution task to shadow table and replace primary table on main cluster. Below is an example algorithm:

1. Copying data from source table to its shadow table, which has different distribution style.
2. Checkpointing the current amount of data copies at the end of each iteration.
3. Blocking background vacuum/ALTERs from running on table under automatic table optimization's operation.
4. Acquiring write-lock when most data of source table is copied to shadow table and performing synchronization between source and shadow table:
   a. Redo deleted rows, and
   b. Undo aborted transactions
5. Acquiring access-exclusive-lock during commit to avoid race condition of the concurrently session that is accessing the source table.
6. Swapping blockchain between source and shadow table.

Phase 2 of online restore may alter the distribution style and sortkey of distribution auto tables without a user's notice. This technique may be fully managed by database service 210 (e.g., by restore into managed database feature 222). The distribution key and sortkey advisor systems may figure out the best distribution style and sortkey of each user defined distribution auto table based on user workload and provide recommendations to the database management system. Database management system launches background worker to alter these tables' distribution style and sortkey accordingly. Thus, the performance of queries ran on distribution auto table will be adaptively and automatically improved.

Database service 210 may allow a user to change the sortkey and distribution key style (alter table to diststyle even is under developing) for user defined tables through SQL commands. The SKA and DKA are available on console and provide recommendations for each cluster. Although these components are ready, in some embodiments a user still needs to check the console to get the alter table commands provided by advisors and executes these commands manually by themselves.

In order to improve users' experience on database service 210, Database service 210 may automatically execute the recommendations provide by sort key advisor and distribution key advisor, so that, the query performance of each cluster be improved automatically without any users' action when performing, for example, phase 2 of an online restore. Thus, database management system may implement a background worker (Auto Alter Table Worker) to accept the requests come from advisor and handle these requests at appropriate time.

Since sort key advisor and distribution key advisor can generate recommendations that conflicts with a user's decisions, bad user experience will happen when an alter table worker and user override the distribution style and/or sortkey on same tables. In some embodiments, where dist-auto tables' to be fully managed by database service 210, Database service 210 is allowed to update their distribution style and sortkey at any proper time. Then, alter table worker can execute recommendations on dist-auto tables' without worrying about racing with user.

In some embodiments, a user may be allowed to register a table under the management of database service 210, a new alter table command: alter table alter diststyle auto (since auto worker should also cover sortkey and may cover column, alter table may be implemented, where <tablename> set property auto can be an alternative command). This command makes source table to be a dist-auto table. After executing this command, the source table can be dist-auto(even), dist-auto(key), or dist-auto(all). The effective distribution style of source table is determined base on source table's properties. No matter what effective distribution style the table has, since it is dist-auto, it is under database service 210's management.

If user wants to avoid the distribution style and/or sortkey of some dist-auto tables to be changed, they can alter these table to have their desired distribution style and/or sortkey. Database service 210 is allowed to change the distribution style, sortkey and column encoding type for dist-auto (or auto) table. User can register a table to be managed by database service 210 through:

1. alter table <tablename> set property auto, or
2. create table <tablename> (<column definition>) auto
3. database level command: alter database set property auto It can de-register a table through: alter table <tablename> alter diststyle even/key/all (since auto worker should also cover sortkey and may cover column encoding type, alter table <tablename> unset property auto can be an alternative command).

There are some large size tables existing. Since altering the distribution style on these table can take few hours and altering diststyle consumes large amount of resource: CPU, network I/O and disk I/O, users' workload can be affected in this period. To avoid a user experiencing performance degradation caused by long running background alter command, database management system may have the ability to create checkpoints of alter command, so that altering giant table can be completed in multiple iterations. This techniques can be implemented in different ways.

In one example, shadow table may be committed, so that it can survive across multiple transactions. In each iteration, part of the content of source table are copied, redistributed into shadow table and committed. Once all content are copied, database management system replaces source table's content with shadow table's blockchain and update source table's catalog. Note: If there are too many deleted rows, it can collect the histogram of deletexid and separate repopulation deletexid step in to several iteration.

In another example, part of the content of a source table can be copied and redistributed and replace the redistributed blocks of source table with shadow table in each iterations. Once all content are replaced, database management system updates source table's catalog with new distribution style.

In some embodiments, an auto alter table worker may be implemented to perform redistributions of data (e.g., as part of phase 2 online restore) This component may be a background worker that executes alter diststyle and/or alter sortkey commands provided by distribution key advisor and sort key advisor. In some embodiments, distribution key advisor and sort key advisory may produce a JSON file, which contains a list of alter diststyle/sortkey commands, to storage service 270. Database management system fetches this file from storage service 270 periodically and assigns its tasks to alter table worker. Alter table workers can execute their tasks when cluster is under low workload or idle based on the cluster workload status provided by Workload monitor.

Alter table worker may alter diststyle auto as a background process. This component may change a source table's distribution style automatically and registering a table to be managed by Database service 210. For change source table's distribution style, this command has following features: 1. If the source table is small table, database management system converts this table to be dist-auto(all). 2. If source table is not small table and is dist-all or dist-even, database management system checks whether there is a recommendation entry for this table, if so database management system converts source table with distribution style specified in recommendations; otherwise, it converts it to dist-auto(even). 3. If source table is not small table and is dist-key, database management system checks whether there is a recommendation entry for this table, if so database management system converts source table with distribution style specified in recommendations; otherwise, database management system converts it to be dist-auto(key). 4. If source table is not small table and is dist-auto, database management system has no-op.

In various embodiments, a database management system supports alter a table's diststyle to be dist-key or dist-all. Database management system may use the following features:
1. Alter a table with any original diststyle to be dist-auto (all).
2. Alter a table with any original diststyle to be dist-even.
3. Alter a table with any original diststyle to be dist-auto (even).
4. Alter a dist-key table to be dist-auto(key).
5. Make all resize to support dist-auto(key) table.
6. Make backup & restore, table-level-restore to support dist-auto(key) table.
7. Make dist-auto(key) table survive from upgrade and downgrade.

The sort key advisor and distribution key advisor components may collect user's queries' log and tables' definition. They analyze whether a new distkey or sortkey can improve user's query performance and provide a recommendation entry if there is. They create a set of new recommendations every few days in a JSON file. The ATW consumes this JSON file and executes its recommendation entries accordingly. Since each recommendation entry contains benefit value, alter table worker may execute recommendations in following order:
1. table with only new sortkey has highest priority
2. non-giant table with both new sortkey and diststyle has second priority
3. non-giant table with only new distkey has third priority
4. giant table with both new sortkey and diststyle has second priority
5. giant table with only new distkey has third priority In some embodiments, a persistent shadow table may be used. The alter diststyle command uses a shadow table to keep the data with new distribution, and achieve snapshot isolation inside transaction. By using shadow table, this technique can pause and resume alter diststyle command naturally. However, the current life-cycle of shadow table ends when its transaction is committed or aborted, database management system may perform the following steps to save shadow table:
1. Create new bootstrap only alter command: "alter diststyle checkpoint", which has only single copy-redistribute-insert iteration and only processes limited number of rows.
2. Once the copy-redistribute-insert iteration is completed, the transaction need to issue a special commit that saves current progress into catalog, persists blockchain of shadow table into disk and save blockchain metadata of shadow table.
3. When next "alter diststyle checkpoint" is executed, database management system continues copy-redistribute-insert job from previous saved checkpoint.
4. Once all data are copied into shadow table, alter diststyle checkpoint will perform "undo aborted txns", "repopulated deleted rows", "rebuild rowids" on shadow table, updates catalog and swaps blockchains between shadow table and source table in commit.

In some embodiments, there will be two system tables that provides information to a user about the execution states of alter table worker. Table "sty_auto_dist_sort" shows the unexecuted alter commands provided by advisor. Table "stl_auto_dist_sort" contains the executed alter commands of alter worker. For example, the execution flow of alter table worker on may be:
1. Alter table worker checks whether cluster is busy by consulting workload queues or other workload information. If it is, alter table worker process sleep for 1 minutes and re-check
2. If cluster is not busy, then alter table worker checks whether there is next recommendation task. If there is no recommendation task, alter table worker process may sleep (e.g., for 1 day) and try to reload the sort key and distribution key recommendation file if there is a new one. 3. If alter table worker finds a recommendation task, alter table worker fetches the next task.

Although FIGS. 2-7 have been described and illustrated in the context of a provider network implementing a database service, like a data warehousing service, the various components illustrated and described in FIGS. 2-7 may be easily applied to other database systems that can utilize online restore to different topologies with custom data distribution. As such, FIGS. 2-7 are not intended to be limiting as to other embodiments of scaling database query processing using additional processing clusters.

Figure 8:
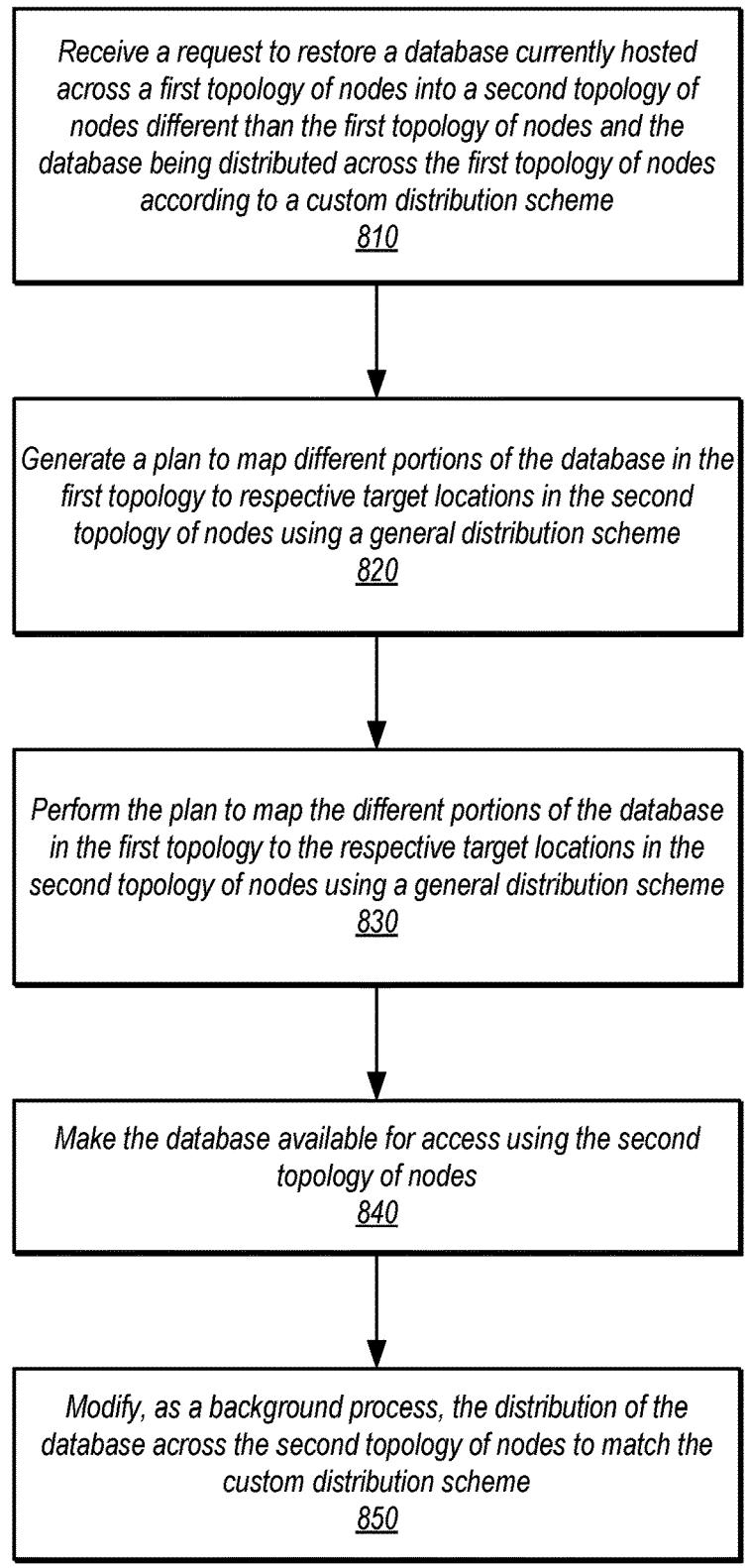
FIG. 8 is a high-level flowchart illustrating methods and techniques to implement online restore to different topologies with custom data distribution, according to some embodiments.

FIG. 8 is a high-level flowchart illustrating methods and techniques to implement online restore to different topologies with custom data distribution, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a second provider network). Different types of query engines or other database systems may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 810, a request may be received to restore a database currently hosted across a first topology of nodes into a second topology of nodes different than the first topology of nodes according to a custom distribution scheme, in some embodiments. For example, the request may be a request to restore one (or more) manually managed databases into a single, service managed database. In some embodiments, the request may be a request to resize the database into the second topology.

As indicated at 820, a plan to map different portions of the database in the first topology into the second topology using a general distribution scheme may be generated, in some embodiments. For example, as discussed in detail above with regard to FIGS. 5-7, the transfer plan may determine whether or not different portions of the database will be merged and to which location they should be stored in the new topology.

As indicated at 830, a plan to map different portions of the database in the first topology to respective target locations in the second topology of nodes using a general distribution scheme may be performed, in some embodiments. For example, compute nodes of a processing cluster may perform instructions to obtain slices of database data from a snapshot (or from other compute nodes). In some embodiments, as discussed above with regard to FIGS. 8-10, encryption may be performed as part of moving the data. For example, the database may be currently unencrypted and stored encrypted in the second topology.

Elements 820 and 830 may be performed as part of a phase 1 of online restore, as discussed above.

As indicated at 840, the database may then be made available for access using the second topology of nodes, in some embodiments. For example, queries and writes may be performed to the database.

For phase 2 of the online restore, the distribution of the database across the second topology of nodes may be modified to match the custom distributions scheme, as indicated at 850. As discussed in detail above, various different techniques for implementing a background process using, for example, a shadow table (as discussed with regard to FIG. 7) may be implemented.

FIG. 9 is a high-level flowchart illustrating methods and techniques to implement phase 1 of online restore, according to some embodiments. As indicated at 910, a database manifest may be obtained, such as the BAR manifest discussed above with regard to FIG. 5. As indicated at 920, a slice transfer plan may be generated, as discussed above with regard to FIG. 6. As indicated at 930, database metadata may be obtained (e.g., catalog data obtained from a leader node and/or from a backup store, such as storage service 270).

As indicated at 940, the slice transfer plan may be performed. As indicated at 912, compute nodes (of the new topology) may execute the transfer plan. As indicated at 922, slices may be extracted (e.g., from a snapshot of the database) and table chains of blocks connected (e.g., connecting data blocks storing records (e.g., in columnar fashion or row-oriented fashion)). As indicated at 932, if the source slices are greater, then slices may be merged and block change made, as indicated at 934. As indicated at 942, if the database data is encrypted, then the data obtained may be encrypted, as indicated at 944. Metadata transfer may also be executed on compute nodes, as indicated at 952.

In some embodiments, after executing the slice transfer plan, the changes to the database at the target system may be committed. As indicated at 950, the data may be distributed using an even distribution conversion technique. However, the custom distribution scheme may be recorded (e.g., in the catalog for phase 2). In some embodiments, after the conversion to even distribution of data, the database may be committed again. As indicated at 960, the database may be restarted into a restore mode to make the database available.

Figure 10:
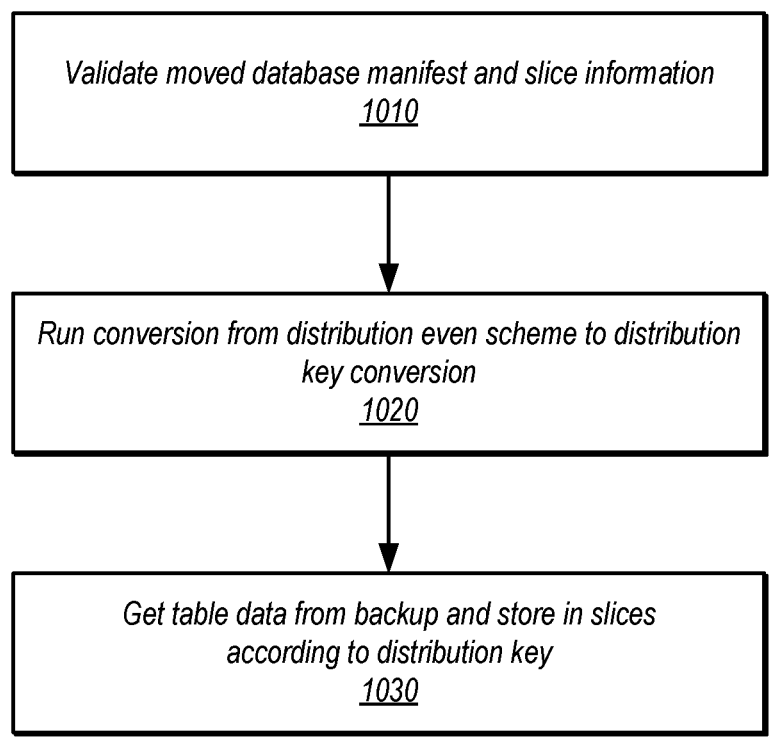
FIG. 10 is a high-level flowchart illustrating methods and techniques to implement phase two of online restore, according to some embodiments.

FIG. 10 is a high-level flowchart illustrating methods and techniques to implement phase 2 of online restore, according to some embodiments. As indicated at 1010, a validation of the move database manifest may be performed. As indicated at 1020, conversion from the even distribution scheme to distribution key scheme (as recorded earlier) may be performed (e.g., using alter table workers as discussed above). Then, similar to the discussion above with regard to 535 in FIG. 5, actual table data as opposed to table metadata may be retrieved (e.g., as used to answer queries), as indicated at 1030.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of online restore to different topologies with custom data distribution as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via VO interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Figure 11:
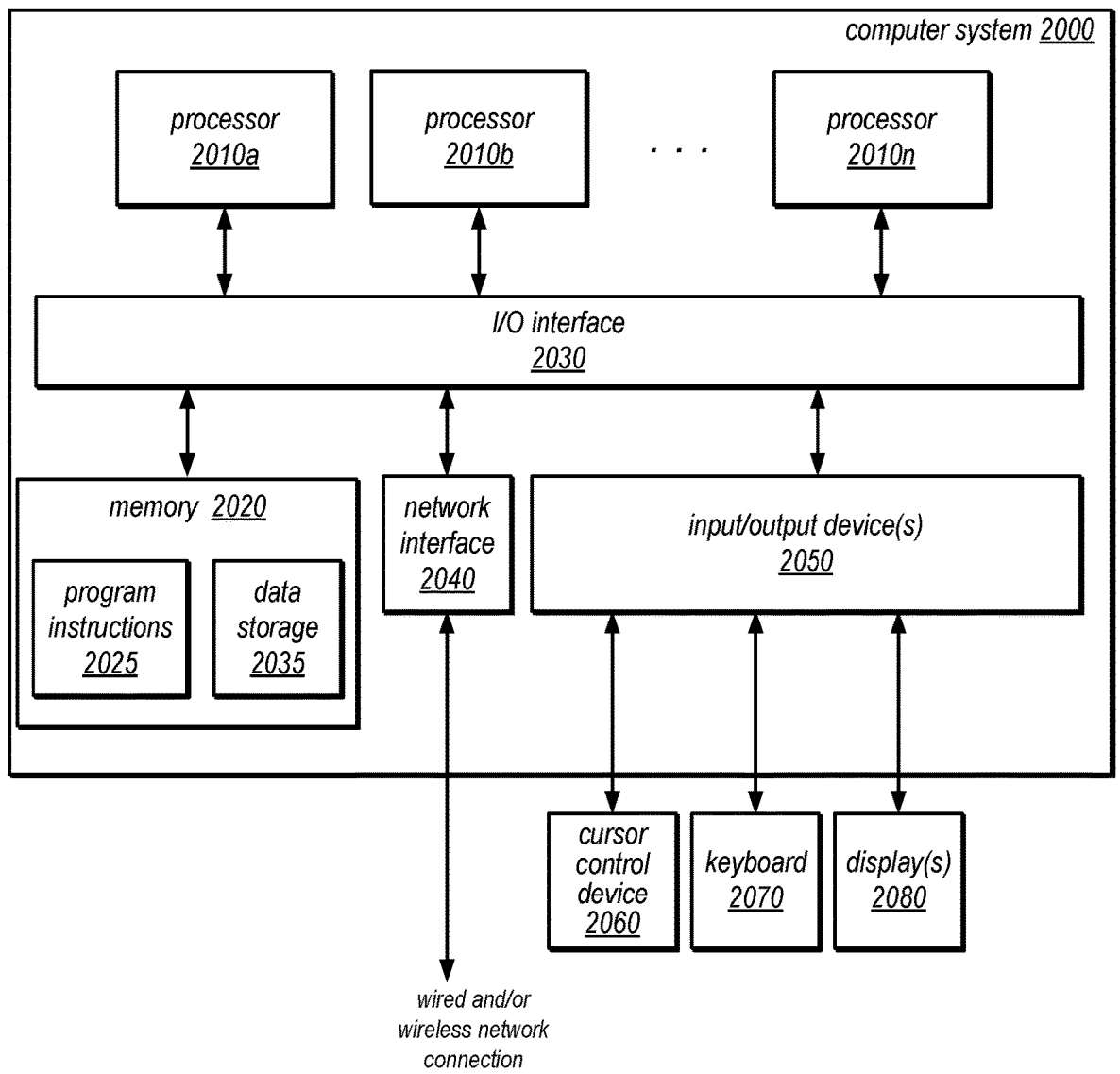
FIG. 11 illustrates an example system that implements the various methods, techniques, and systems described herein, according to some embodiments.

As shown in FIG. 11, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices, respectively comprising at least one processor and a memory that implement a database service of a provider network, wherein the database service is configured to:
   receive a request to restore a manually managed database currently hosted across a first topology of a first plurality of nodes as a service managed database, wherein the restore of the manually managed database as a service managed database restores the manually managed database into a second plurality of nodes with a second topology different than the first topology of the first plurality of nodes, wherein the manually managed database is distributed across the first topology of nodes according to a custom distribution scheme;
   generate a plan to map different portions of the manually managed database in the first topology to respective target locations in the second plurality of nodes according to the second topology using a general distribution scheme;
   perform the plan to map the different portions of the manually managed database in the first topology to the respective target locations in the second plurality of nodes according to the second topology;
   after performing the plan:
     make the service managed database available for access using the second plurality of nodes; and
     modify, as a background process, the distribution of the service managed database across the second topology of the second plurality of nodes to match the custom distribution scheme.

2. The system of claim 1, wherein the database service is configured to encrypt the manually managed database as part of the performance of the plan to move the different portions of the manually managed database in the first topology to the respective target locations in the second plurality of nodes according to the second topology.

3. A method, comprising:
   receiving a request to restore a database currently hosted across a first topology of a first plurality of nodes into a second plurality of nodes with a second topology different than the first topology of the first plurality of nodes, wherein the database is distributed across the first topology of nodes according to a custom distribution scheme;

generating a plan to map different portions of the database in the first topology to respective target locations in the second plurality of nodes according to the second topology using a general distribution scheme;

performing the plan to map the different portions of the database in the first topology to the respective target locations in the second plurality of nodes according to the second topology;

after performing the plan:
  making the database available for access using the second plurality of nodes; and
  modifying, as a background process, the distribution of the database across the second topology of the second plurality of nodes to match the custom distribution scheme.

4. The system of claim 1, wherein the database service is configured to merge one or more portions of the manually managed database into the second topology of the second plurality of nodes as part of the performance of the plan to move the different portions of the manually managed database in the first topology to the respective target locations in the second plurality of nodes according to the second topology.

5. The system of claim 1, wherein to modify the distribution of the service managed database across the second topology of the second plurality of nodes to match the custom distribution scheme, the database service is configured to create one or more shadow tables of the service managed database to apply the modifications to match the custom distribution scheme.

6. The method of claim 3, wherein performing the plan comprises encrypting the database as part of moving the different portions of the database in the first topology to the respective target locations in the second plurality of nodes according to the second topology.

7. The method of claim 3, wherein the plan merges one or more portions of the database in the second topology of the second plurality of nodes as part of the performance of the plan to move the different portions of the database in the first topology to the respective target locations in the second plurality of nodes according to the second topology.

8. The method of claim 3, wherein modifying the distribution of the database across the second topology of the second plurality of nodes to match the custom distribution scheme comprises creating one or more shadow tables of the database to apply the modifications to match the custom distribution scheme and swapping to the one or more shadow tables after the one or more shadow tables are made consistent.

9. The method of claim 3, wherein the second topology includes at least one of a greater number of nodes or slices per node than the first topology.

10. The method of claim 3, wherein a first query is performed by the second plurality of nodes using a query plan that utilizes the general distribution scheme, and wherein a second query is performed by the second query of nodes after the distribution of the database is modified across the second topology of the second plurality of nodes to match the custom distribution scheme using the custom distribution scheme.

11. The method of claim 3, wherein generating the plan comprises obtaining a manifest that describes the first topology and mapping the different portions of the database in the first topology to the respective target locations in the second plurality of nodes according to the second topology using a round-robin distribution scheme.

12. The method of claim 3, wherein the custom distribution scheme is a distribution scheme applied using respectively specified keys for one or more tables of the database.

13. The method of claim 3, wherein the first topology is associated with a manual management mode for the database offered by a database service hosting the database and wherein the second topology is associated with a serverless management mode offered by the database service.

14. One or more non-transitory, computer-readable storage media, storing program instructions that when executed on or across one or more computing devices cause the one or more computing devices to implement:

receiving a request to restore a database currently hosted across a first topology of a first plurality of nodes into a second plurality of nodes with a second topology different than the first topology of the first plurality of nodes, wherein the database is distributed across the first topology of nodes according to a custom distribution scheme;

generating a plan to map different portions of the database in the first topology to respective target locations in the second plurality of nodes according to the second topology using a general distribution scheme;

performing the plan to map the different portions of the database in the first topology to the respective target locations in the second plurality of nodes according to the second topology;

after performing the plan:
  making the database available for access using the second plurality of nodes; and
  modifying, as a background process, the distribution of the database across the second topology of the second plurality of nodes to match the custom distribution scheme.

15. The one or more non-transitory, computer-readable storage media of claim 14, wherein the plan merges one or more portions of the database in the second topology of the second plurality of nodes as part of the performance of the plan to move the different portions of the database in the first topology to the respective target locations in the second plurality of nodes according to the second topology.

16. The one or more non-transitory, computer-readable storage media of claim 14, wherein, in modifying the distribution of the database across the second topology of the second plurality of nodes to match the custom distribution scheme, the program instructions cause the one or more computing devices to implement creating one or more shadow tables of the database to apply the modifications to match the custom distribution scheme and swapping to the one or more shadow tables after the one or more shadow tables are made consistent.

17. The one or more non-transitory, computer-readable storage media of claim 14, wherein a first query is performed by the second plurality of nodes using a query plan that utilizes the general distribution scheme, and wherein a second query is performed by the second query of nodes after the distribution of the database is modified across the second topology of the second plurality of nodes to match the custom distribution scheme using the custom distribution scheme.

18. The one or more non-transitory, computer-readable storage media of claim 14, wherein, in generating the plan, the program instructions cause the one or more computing devices to implement obtaining a manifest that describes the first topology and mapping the different portions of the database in the first topology to the respective target locations in the second plurality of nodes according to the second topology using a round-robin distribution scheme.

19. The one or more non-transitory, computer-readable storage media of claim 14, wherein the custom distribution scheme is a distribution scheme applied using respectively specified keys for one or more tables of the database.

20. The one or more non-transitory, computer-readable storage media of claim 14, wherein the first topology is associated with a manual management mode for the database offered by a database service hosting the database and wherein the second topology is associated with a serverless management mode offered by the database service.

\* \* \* \* \*